(12) United States Patent
Ahn

(10) Patent No.: US 11,473,516 B2
(45) Date of Patent: Oct. 18, 2022

(54) METHOD AND SYSTEM FOR IMPROVING ACCURACY OF CORRECTION OF FUEL QUANTITY AT THE TIME WHEN RECIRCULATION VALVE IS OPENED

(71) Applicants: Hyundai Motor Company, Seoul (KR); KIA Motors Corporation, Seoul (KR)

(72) Inventor: Tae-Ho Ahn, Incheon (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 185 days.

(21) Appl. No.: 16/672,693

(22) Filed: Nov. 4, 2019

(65) Prior Publication Data
US 2020/0271064 A1 Aug. 27, 2020

(30) Foreign Application Priority Data
Feb. 26, 2019 (KR) .................. 10-2019-0022353

(51) Int. Cl.
*F02D 41/00* (2006.01)
*F02M 25/08* (2006.01)
*F02M 59/38* (2006.01)

(52) U.S. Cl.
CPC ..... *F02D 41/0045* (2013.01); *F02M 25/0836* (2013.01); *F02M 25/0854* (2013.01); *F02M 59/38* (2013.01)

(58) Field of Classification Search
CPC ............ F02D 41/0045; F02D 41/1441; F02D 2200/0402; F02D 41/0007; F02D 41/0042; F02D 41/1473; F02D 41/004; F02D 41/0077; F02D 41/1459; F02D 41/30; F02D 41/0072; F02D 2041/1433; F02D 41/182;
(Continued)

(56) References Cited

U.S. PATENT DOCUMENTS 5,363,832 A * 11/1994 Suzumura ............... F02M 25/08
                                                                 123/704
5,967,125 A * 10/1999 Morikawa ........... F02D 13/0234
                                                                 123/90.15
(Continued)

FOREIGN PATENT DOCUMENTS

KR    10-1998-0038643 A    8/1998

*Primary Examiner* — Scott A Reinbold
(74) *Attorney, Agent, or Firm* — Lempia Summerfield Katz LLC; Seung-Hyun Jang

(57) ABSTRACT

A method for improving accuracy of correction of fuel quantity at the time when a recirculation valve (RCV) is opened, may include a step of correcting injection amount of fuel based on consideration factors when the RCV is operated to be opened. The consideration factors include property values of a flow path of the RCV, the flow path being mounted to an intake pipe to connect between a front end of a compressor close to the atmosphere and a rear end of the compressor adjacent to combustion chambers, a first calculation value obtained by calculating amount of air to be introduced into the combustion chambers after circulating from the flow path of the RCV to the intake pipe, and a second calculation value obtained by calculating amount of hydrocarbon to be introduced into the flow path of the RCV by purging evaporative gas.

5 Claims, 12 Drawing Sheets

(58) Field of Classification Search
CPC .......... F02M 25/0836; F02M 25/0854; F02M 59/38; F02M 25/089; Y02T 10/12
USPC ...................................................... 123/520
See application file for complete search history.

(56) References Cited

U.S. PATENT DOCUMENTS

| | | | | |
|---|---|---|---|---|
| 6,167,877 | B1* | 1/2001 | Sanyal | F02M 25/08 |
| | | | | 123/320 |
| 2008/0077304 | A1* | 3/2008 | Suzuki | F02D 41/1454 |
| | | | | 701/102 |
| 2009/0112447 | A1* | 4/2009 | Ishizuka | F02D 41/18 |
| | | | | 701/109 |
| 2014/0096750 | A1* | 4/2014 | Pearce | F02M 25/089 |
| | | | | 123/520 |
| 2016/0369713 | A1* | 12/2016 | Pursifull | F02M 35/104 |
| 2019/0301390 | A1* | 10/2019 | Miyata | F02D 41/34 |
| 2021/0180530 | A1* | 6/2021 | Sasaki | F02M 25/08 |
| 2021/0310445 | A1* | 10/2021 | Kato | F02B 33/00 |

* cited by examiner

METHOD AND SYSTEM FOR IMPROVING ACCURACY OF CORRECTION OF FUEL QUANTITY AT THE TIME WHEN RECIRCULATION VALVE IS OPENED

CROSS-REFERENCE TO RELATED APPLICATIONS

This application claims priority to and the benefit of Korean Patent Application No. 10-2019-0022353, filed on Feb. 26, 2019, which is incorporated herein by reference in its entirety.

FIELD

The present disclosure relates to a method and a system for improving accuracy of correction of fuel quantity at the time when a recirculation valve (RCV) is opened.

BACKGROUND

The statements in this section merely provide background information related to the present disclosure and may not constitute prior art.

A turbocharger for compressing and supplying intake air to combustion chambers is mounted to intake and exhaust pipes. The turbocharger includes a turbo mounted to the exhaust pipe to be rotated by exhaust gas and a compressor mounted to the intake pipe to rotate depending on rotation of the turbo so as to compress intake air.

However, when an opening amount of a throttle is small, the whole of the air compressed by the compressor cannot be injected into the combustion chambers. This causes a vibration or ringing phenomenon in the turbocharger or compressor. A recirculation valve (RCV) and a flow path of the RCV are mounted to the intake pipe to turn the air compressed by the compressor toward the front end of the intake pipe in order to inhibit such vibration and ringing phenomenon. The RCV is operated in such a manner that it is opened when an opening amount of an accelerator pedal is rapidly reduced. The flow path of the RCV is connected at its both ends to the intake pipe to connect such that front and rear ends of the compressor are connected to each other.

On the other hand, evaporative gas may be generated in a fuel tank depending on changes in atmospheric pressure and temperature. If the evaporative gas generated in the fuel tank accumulates, internal pressure of the fuel tank may be increased more than necessary. If the internal pressure of the fuel tank is increased, there is a possibility for the evaporative gas to leak into the atmosphere.

A canister for adsorbing the evaporative gas is installed in a vehicle in order to inhibit the evaporative gas from leaking into the atmosphere. The evaporative gas that has been adsorbed to the canister flows into the combustion chambers through the intake pipe and is, in turn, purged by being oxidized with fuel. At this time, as hydrocarbon derived from the evaporative gas is supplied to the combustion chambers, amount of fuel injected into the combustion chambers is desired to be corrected by estimating the amount of hydrocarbon derived from the evaporative gas.

However, we have discovered that when the RCV is operated while the evaporative gas is purged, some of the evaporative gas flows into the flow path of the RCV and circulates through the intake pipe and the flow path of the RCV, which causes an error in the amount of hydrocarbon estimated to flow into the combustion chamber. Actual amount of fuel and hydrocarbon burned in the combustion chambers is smaller than an estimated value because of an error in the estimated amount of hydrocarbon. As the actual amount of fuel and hydrocarbon burned in the combustion chambers becomes deficient, there is a possibility that misfire occurs or an engine is stopped.

In addition, we have further discovered that there is a sequential time delay between a time point when operation of an accelerator pedal is discontinued and a time point when the RCV is operated as well as a time point when the opening amount of the throttle is reduced. As the boost pressure by a supercharger is high and the RCV is operated in a state where the throttle is not sufficiently closed, amount of air to be supplied to the combustion chambers is reduced.

The above information disclosed in this Background section is only for enhancement of understanding of the background of the present disclosure, and therefore it may contain information that does not form the prior art that is already known to a person of ordinary skill in the art.

SUMMARY

The present disclosure provides a method and a system for improving accuracy of correction of fuel quantity at the time when a recirculation valve (RCV) is opened, in which occurrence of misfire and stoppage of an engine are inhibited by correcting injection amount of fuel in synthetic consideration of hydrocarbon entering an intake pipe and a flow path of the RCV at the time of purging evaporative gas.

In accordance with one aspect of the present disclosure, a method for improving accuracy of correction of fuel quantity at the time when an RCV is opened including steps of correcting injection amount of fuel based on consideration factors when the RCV is operated to be opened. The consideration factors include property values of a flow path of the RCV, the flow path being mounted to an intake pipe to connect between a front end of a compressor close to the atmosphere and a rear end of the compressor adjacent to combustion chambers, a first calculation value obtained by calculating amount of air to be introduced into the combustion chambers after circulating from the flow path of the RCV to the intake pipe, and a second calculation value obtained by calculating amount of hydrocarbon introduced into the flow path of the RCV by purging evaporative gas.

The property values of the flow path of the RCV may include concentration of hydrocarbon contained in circulative intake air circulated to the intake pipe. The concentration of hydrocarbon may be calculated based on a spread/delay model constructed by modeling spread/delay of gas introduced into the flow path of the RCV.

In accordance with a further aspect of the present disclosure, a spread/delay model function may be derived from the spread/delay model constructed by modeling spread/delay of gas introduced into the flow path of the RCV wherein property values of the flow path of the RCV may include one of prediction values of changes in concentration of hydrocarbon in the flow path of the RCV, which is calculated based on the spread/delay model function.

In accordance with a further aspect of the present disclosure, the first calculation value may be calculated based on opening amount of the RCV and a throttle modeling function. The second calculation value may be calculated based on a modeling function derived from signals acquired from sensors provided in the spread/delay model. Furthermore, concentration and flow rate of hydrocarbon may be measured by measurement sensors therefor.

In accordance with another aspect of the present disclosure, a system for improving accuracy of correction of fuel quantity at the time when an RCV is opened, includes a canister connected to a fuel tank to adsorb evaporative gas, a purge line connecting the canister and an intake pipe, an active purge pump and a PCSV, which are mounted to the purge line, a first pressure sensor mounted to the purge line so as to be positioned between the active purge pump and the PCSV, a second pressure sensor mounted to the purge line so as to be positioned between the canister and the active purge pump, a compressor mounted to the intake pipe, a flow path of the RCV mounted to the intake pipe to connect between a front end of a compressor close to the atmosphere and a rear end of the compressor adjacent to combustion chambers, and the RCV mounted to a junction at the rear end of the compressor out of junctions between the flow path of the RCV and the intake pipe. Injection amount of fuel to be injected into the combustions chambers is corrected based on consideration factors when the RCV is operated to be opened. In addition, the consideration factors include property values of the flow path of the RCV, a first calculation value obtained by calculating amount of air to be introduced into the combustion chambers after circulating from the flow path of the RCV to the intake pipe, and a second calculation value obtained by calculating amount of hydrocarbon introduced into the intake pipe from the flow path of the RCV by purging evaporative gas.

In accordance with a further aspect of the present disclosure, flow rate and flow velocity measurement sensors may be mounted to the intake pipe and the purge line, respectively.

Moreover, the system may further include a control unit which receive signals from the sensors. The control unit may include a spread/delay model function constructed by modeling spread/delay of the gas introduced into the flow path of the RCV and a throttle modeling function for estimating amount of air to be introduced into the combustion chambers out of circulative intake air to be circulated from the flow path of the RCV to the intake pipe when the RCV is opened.

In the method and system for improving accuracy of correction of fuel quantity at the time when the RCV is opened, as configured above according to a form of the present disclosure, the amount of fuel injected into the combustion chambers is corrected based on the amount of hydrocarbon to be introduced into the combustion chambers after having been introduced into the flow path of the RCV when the RCV is operated and then mixed with the evaporative gas, thereby inhibiting occurrence of misfire and engine stoppage, which may be caused because amount of fuel injected is deficient.

Furthermore, even if there is a sequential time delay between a time point when operation of an accelerator pedal is discontinued and a time point when the RCV is operated as well as a time point when opening amount of a throttle is reduced, injection amount of fuel can be controlled appropriately depending on amount of air to be supplied to the combustion chambers because amount of fuel is corrected at the time point when the RCV is operated.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
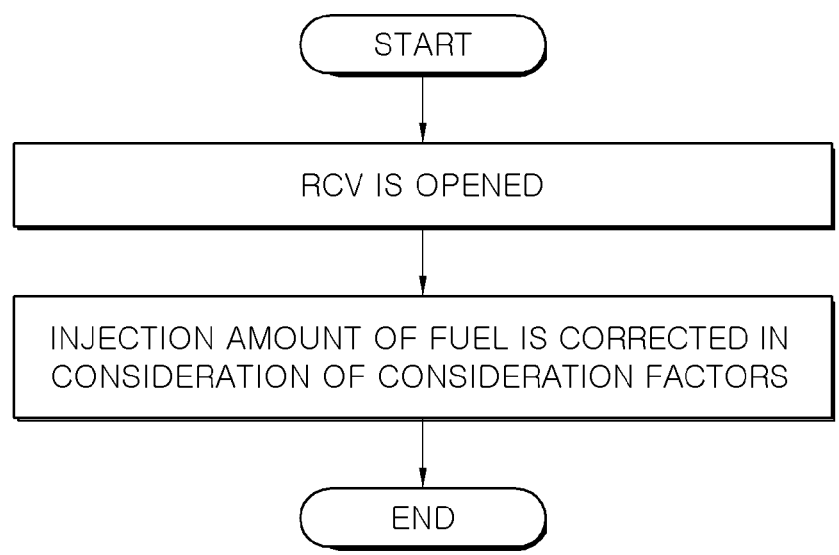
FIG. 1 is a flowchart of a method for improving accuracy of correction of fuel quantity at the time when an RCV is opened, according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, preferred forms of a method and a system for improving accuracy of correction of fuel quantity at the time when a Recirculation valve (RCV) is opened are described in detail with reference to the accompanying drawings.

As shown in FIG. 1, a method for improving accuracy of correction of fuel quantity at the time when an RCV is opened, according to a form of the present disclosure, corrects injection amount of fuel based on consideration factors when the RCV 900 is operated to be opened. (See FIG. 11). The consideration factors comprise property values of a flow path 800 of the RCV 900, which is mounted to an intake pipe I to connect between a front end of a compressor 700 close to the atmosphere and a rear end of the compressor 700 adjacent to combustion chambers, a first calculation value obtained by calculating amount of air to be introduced into the combustion chambers after circulating from the flow path 800 of the RCV 900 to the intake pipe I, and a second calculation value obtained by calculating amount of hydrocarbon introduced into the flow path 800 of the RCV 900 by purging evaporative gas.

A spread/delay model is constructed by modeling spread/delay of gas introduced into a flow path 800 of the RCV. A spread/delay model function that simulates spread/delay of the gas introduced into the flow path 800 of the RCV 900 is derived from the spread/delay model. Property values of the flow path 800 of the RCV 900 comprise one of prediction values of changes in concentration of hydrocarbon in the flow path 800 of the RCV 900, which is calculated based on the spread/delay model function. The property values of the flow path 800 of the RCV 900 may be prediction values of changes in concentration of hydrocarbon at the farthest rear end of the flow path 800 of the RCV, that is, concentration of hydrocarbon contained in circulative intake air circulated from the flow path 800 of the RCV 900 to the intake pipe I.

Figure 2:
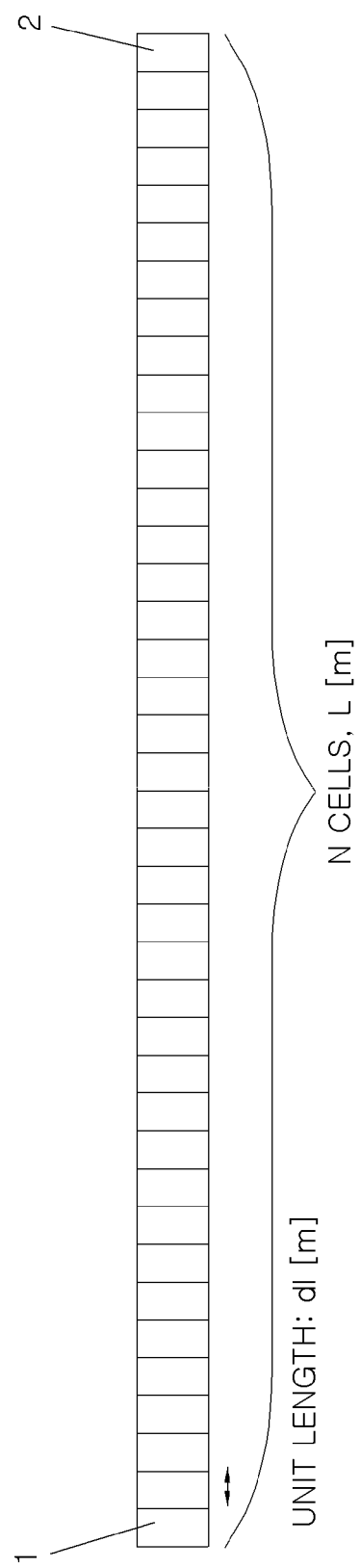
FIGS. 2 to 8 are diagrams for explaining a spread/delay model constructed by modeling spread/delay of gas introduced into a flow path of the RCV respectively.

The spread/delay model has a buffer made up of a predetermined number N of cells, as shown in FIG. 2. Cells are arranged in a manner of extending in a longitudinal direction wherein a set of the entire cells represents the flow path 800 of the RCV 900. Therefore, a total length of a buffer represents the length L of the flow path 800 of the RCV wherein a unit length dl of one cell of the buffer made up of N cells corresponds to a value L/N obtained by dividing the total length L by the number N of cells.

Figure 3:
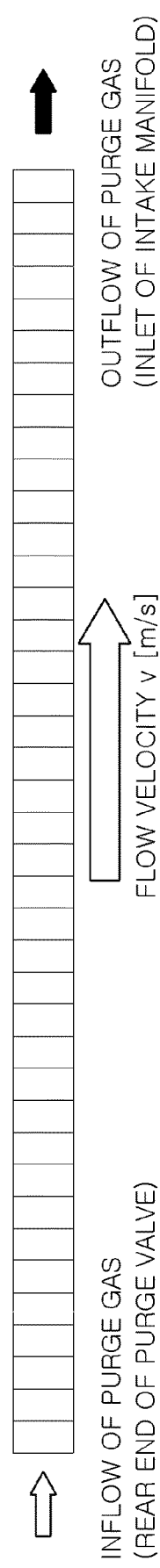

As shown in FIG. 3, the first cell corresponds to an inlet through which the circulative intake air containing the evaporative gas flows from the intake pipe I into the flow path 800 of the RCV. In addition, the last cell 2 corresponds to an outlet of the flow path 800 of the RCV, through the circulative intake air flows out to the intake pipe. In other words, the circulative intake air flows into the first cell 1 and then flows out from the last cell 2. In this case, it is assumed that flow velocity v in the flow path 800 of the RCV is constant and that the circulative intake air flowing into the flow path 800 of the RCV at a velocity corresponding to the flow velocity v moves from the inlet to the outlet. In other words, it is assumed that there is no compression of the circulative intake air in the flow path 800 of the RCV. The flow velocity v at this time becomes a value "L/tdelay" obtained by dividing the length of the flow path 800 of the RCV by delay time "tdelay" during which the circulative intake air reaches from the inlet to the outlet.

Figure 4:
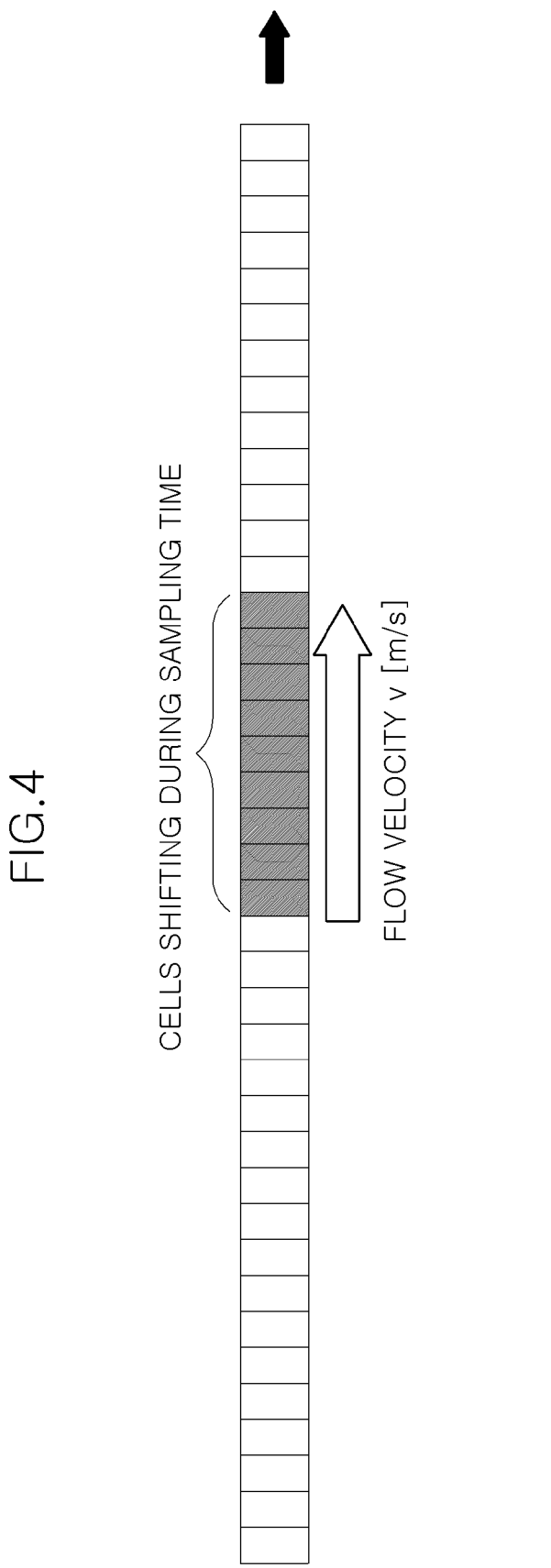

As shown in FIG. 4, as the circulative intake air moves continuously in the flow path 800 of the RCV, one cell shifts by a predetermined number of cells for a predetermined time.

In other words, when sampling time is denoted by dT, distance "dflow" shifted during the sampling time becomes a value "L/tdelay×dT" obtained by multiplying the flow velocity v by the sampling time dT. Accordingly, the number of cells shifted during the sampling time becomes a value "dT×N/tdelay" obtained by dividing "L/tdelay×dT" by length per cell. In this case, as the number of cells is an integer, a value obtained by discarding a value after the decimal point becomes the number of cells shifting during the sampling time.

The spread/delay model divides the flow path 800 of the RCV into a predetermined number of cells and is constructed by assuming that the cell shifts in every unit time period (or sampling time).

FIGS. 5 to 8 are diagrams for explaining a way to calculate concentration of hydrocarbon contained in the circulative intake air to be introduced into the intake pipe I by using the spread/delay model.

Figure 5:
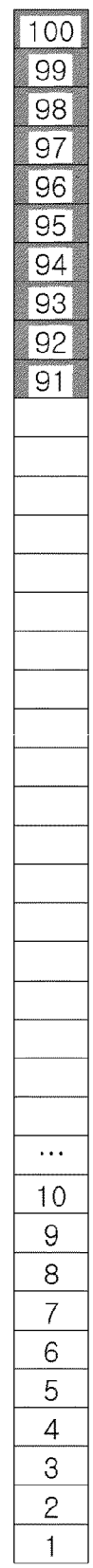

A form of the spread/delay model shown in FIG. 5 has a buffer made up of 100 cells. Delay time is derived using information related to the flow velocity of the circulative intake air, for example, flow rate Q of the circulative intake air. Then, the number of cells shifting during the sampling time dT is calculated using the delay time together with predetermined sampling time dT and number of cells. In this example, the number of cells shifting during the sampling time dT is ten. Therefore, the last ten cells deeply colored in FIG. 5 represents the circulative intake air moving to the intake pipe I during the sampling time dT.

When the circulative intake air initially flows into the flow path 800 of the RCV, concentration of hydrocarbon and flow rate at the time point are assigned to the buffer corresponding to the cells from the first cell 1 to the tenth cell 10 corresponding to the predetermined number of cells (10 in this example). At this time, all 10 cells are assigned the same value.

Figure 6:
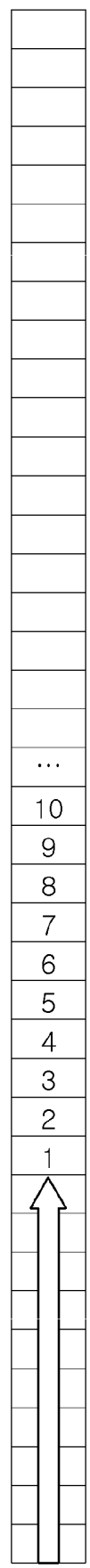

Then, as shown in FIG. 6, all the data in the buffer are shifted by the predetermined number of cells toward the outlet in every sampling period. At this time, an average value of values of concentration of hydrocarbon stored in the last ten cells deeply colored in FIG. 5 becomes concentration of hydrocarbon to be introduced into the intake pipe I.

Figure 7:
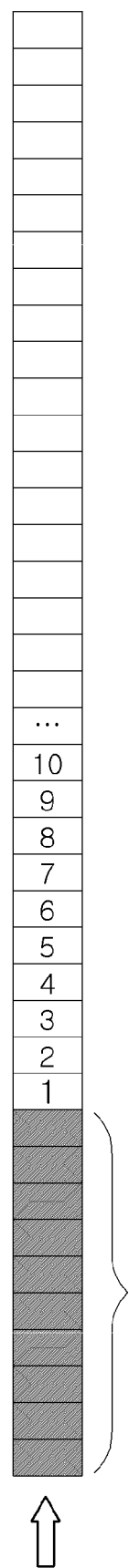

On the other hand, as shown in FIG. 7, when the new circulative intake air flows in continuously, flow rate and concentration of hydrocarbon flowing in are newly assigned to the buffer corresponding to the cells corresponding to the predetermined number of cells from the first cell. The procedures shown in FIGS. 6 and 7 are repeatedly performed when the circulative intake air flows into the flow path 800 of the RCV continuously. On the other hand, if flow rate of the evaporative gas changes in the procedure, the number of cells shifting during the sampling time dT is recalculated and then the cells are shifted (values stored in the buffer of each cell is updated).

Figure 8:

On the other hand, as shown in FIG. 8, when inflow of fresh circulative intake air is interrupted, the cell during the sampling period in a state where the inflow of the circulative intake is interrupted becomes an empty buffer to which no concentration of hydrocarbon is assigned. In addition, at this time, concentration of hydrocarbon flowing into the intake pipe I is calculated by multiplying the rate of the number of cells where concentration of hydrocarbon is input to the buffer up to now by the average value of values of concentration of hydrocarbon, which is assigned to the cell. In the example of FIG. 8, concentration of hydrocarbon is assigned to 90 cells. In this case, concentration of hydrocarbon is 90% of the average value of values of concentration of hydrocarbon, which is stored in the cell.

By using the spread/delay model as described above, it is possible to derive a spread/delay model function that can simulate change in concentration of hydrocarbon in the flow path 800 of the RCV, that is, spread/delay of hydrocarbon gas. In addition, concentration of hydrocarbon at the time point that the circulative intake air is recirculated to the intake pipe I can be calculated based on the spread/delay model function. According to an example of the present disclosure, the spread/delay model function can simulate the spread/delay of hydrocarbon gas in the flow path 800 of the RCV, using concentration, flow rate and flow velocity of hydrocarbon of gas to be introduced into the flow path 800 of the RCV as variables. According to another example of the present disclosure, the spread/delay model function may be provided as a table, a graph, or the like as well as a numerical formula, in which various environmental factors are taken as variables.

The first calculation value is calculated based on opening amount of the RCV 900 and a throttle modeling function. The throttle modeling function is a function for estimating the intake air passing through a throttle depending on opening amount of a throttle mounted in a throttle valve. The throttle modeling function is provided as a numerical formula, a table, a graph, or the like taking various environmental factors as variables, which is established trough repeated experiments.

According to a form of the present disclosure, for example, when opening amount of an accelerator pedal is reduced and opening amount of the throttle valve is reduced in the region where the RCV 900 is not operated, it is detected whether a surge phenomenon, that is, a phenomenon that a turbocharger shakes, occurs. It is detected whether internal pressure of the turbocharger is greatly fluctuated based on deviation of signals generated from a sensor mounted to the turbocharger. If the internal pressure of the turbocharger greatly fluctuates above the reference value, it is determined that a surge phenomenon occurs.

Whether to open the RCV 900 when a surge phenomenon occurs is determined by an RCV operation program prepared in advance. The RCV operation program is incorporated in a control unit 1000. When the RCV 900 is opened, the RCV operation program checks if there is an area where an error in measuring quantity of air occurs based on signals sensed by a mass flow sensor (MAF) and a lambda sensor. Then, it defines delay at the time when the RCV 900 is operated to be opened/closed and derives a throttle model flow rate, that is, the first calculation value.

The second calculation value is calculated based on a modeling function derived from signals acquired from sensors provided in the spread/delay model. The modeling function is provided as a numerical formula, a table, a graph, or the like taking various environmental factors as variables.

Figure 9:
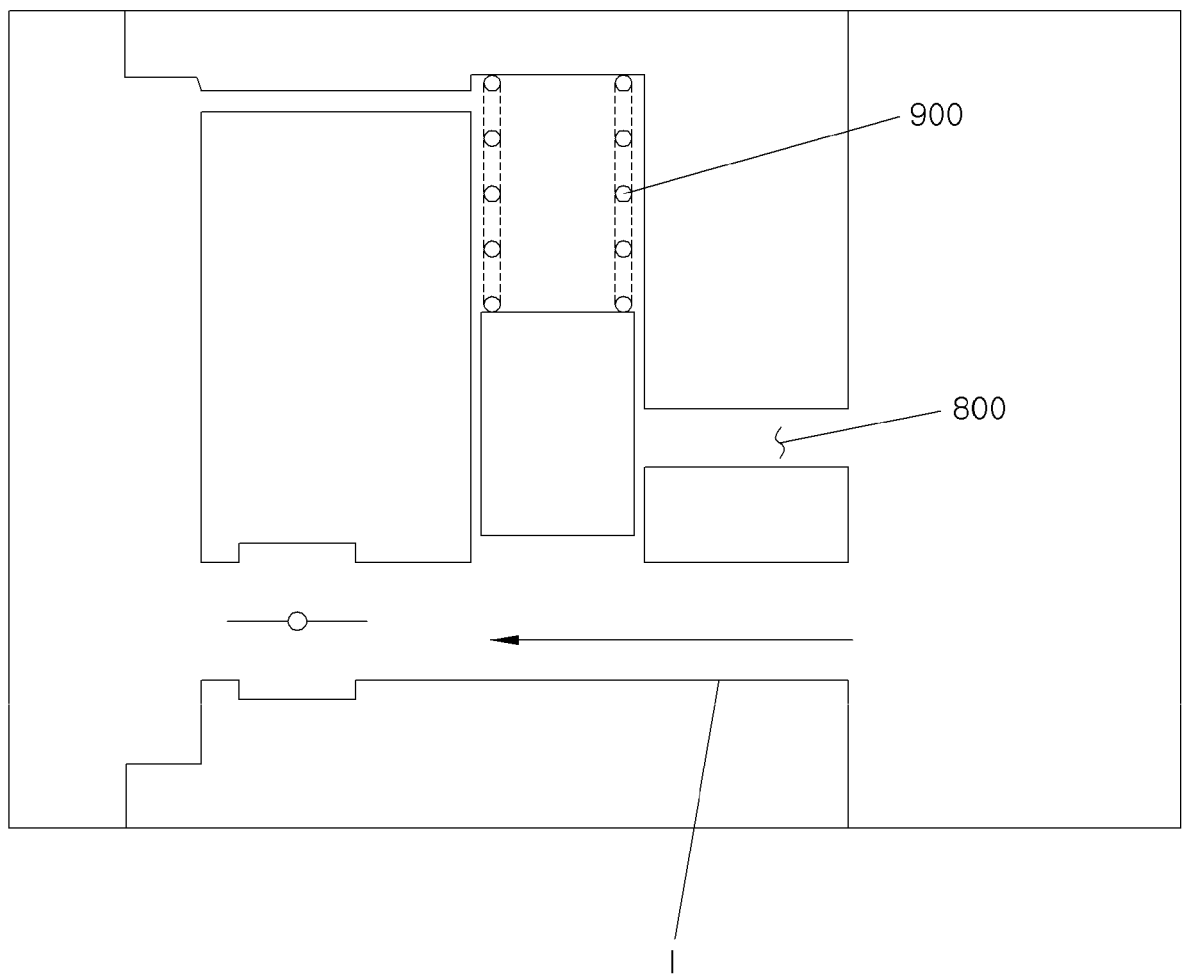
FIGS. 9 to 10 are schematic views illustrating operation of the RCV respectively.
Figure 10:
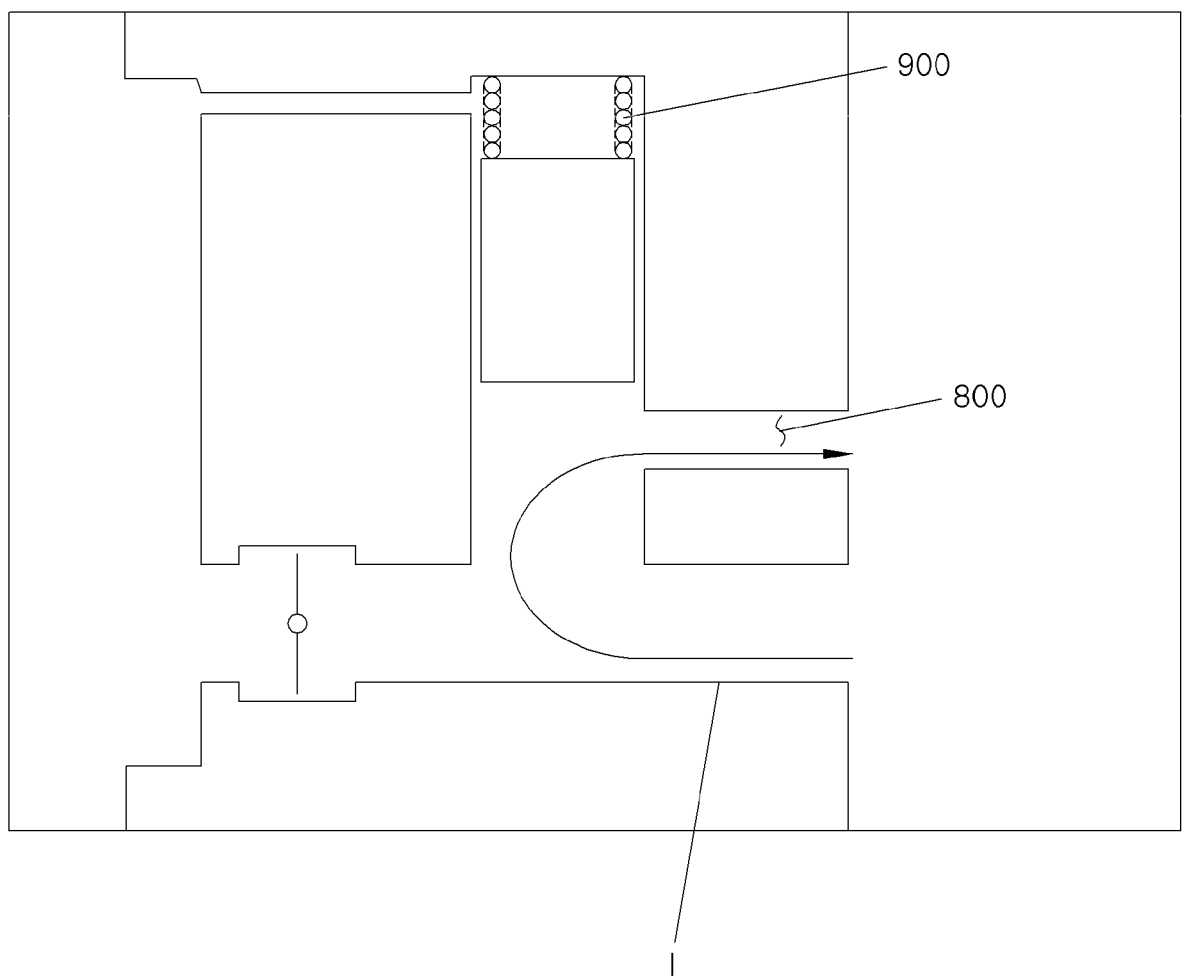

The RCV 900 is mounted to a junction at a rear end of the compressor 700 out of junctions between the flow path 800 of the RCV and the intake pipe I. The RCV 900 operates to be opened when a vibration or ringing phenomenon occurs in the compressor 700 or a turbo that rotates the compressor 700 by exhaust gas (see FIGS. 9 and 10). The flow path 800 of the RCV is equipped with a sensor for measuring flow rate of air flowing therein. The flow rate of the air flowing into the flow path 800 of the RCV is calculated based on opening amount of the RCV 900 mounted to the junction at the rear end of the compressor 700 out of junctions between the flow path 800 of the RCV and the intake pipe I together with the throttle modeling function prepared in advance.

Figure 11:
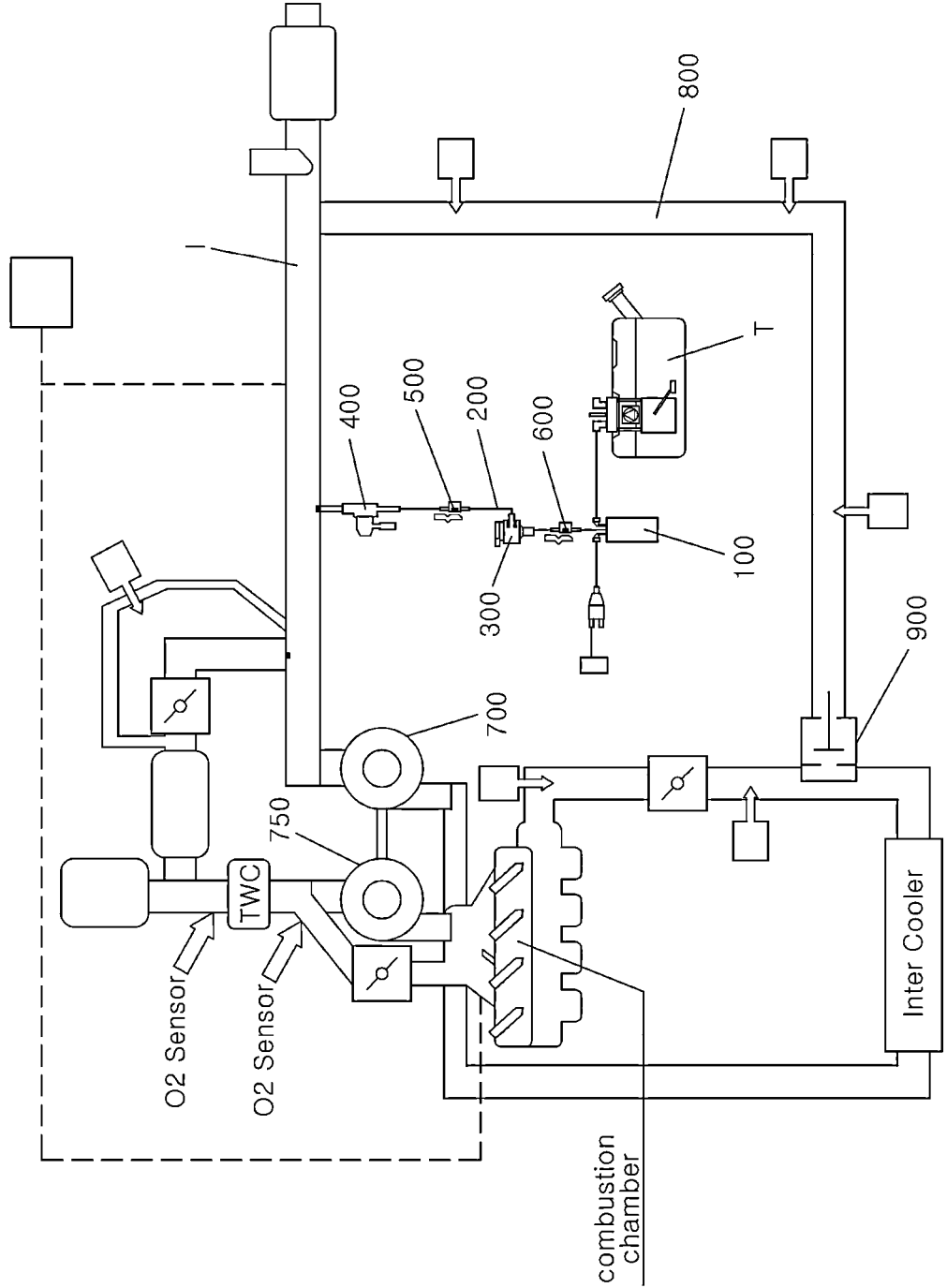
FIG. 11 is a schematic diagram illustrating a system for improving accuracy of correction of fuel quantity at the time when an RCV is opened, according to a form of the present disclosure.

The method for improving accuracy of correction of fuel quantity at the time when an RCV 900 is opened, as configured above according to a form of the present disclosure, is applied to a system shown in FIG. 11.

Figure 12:
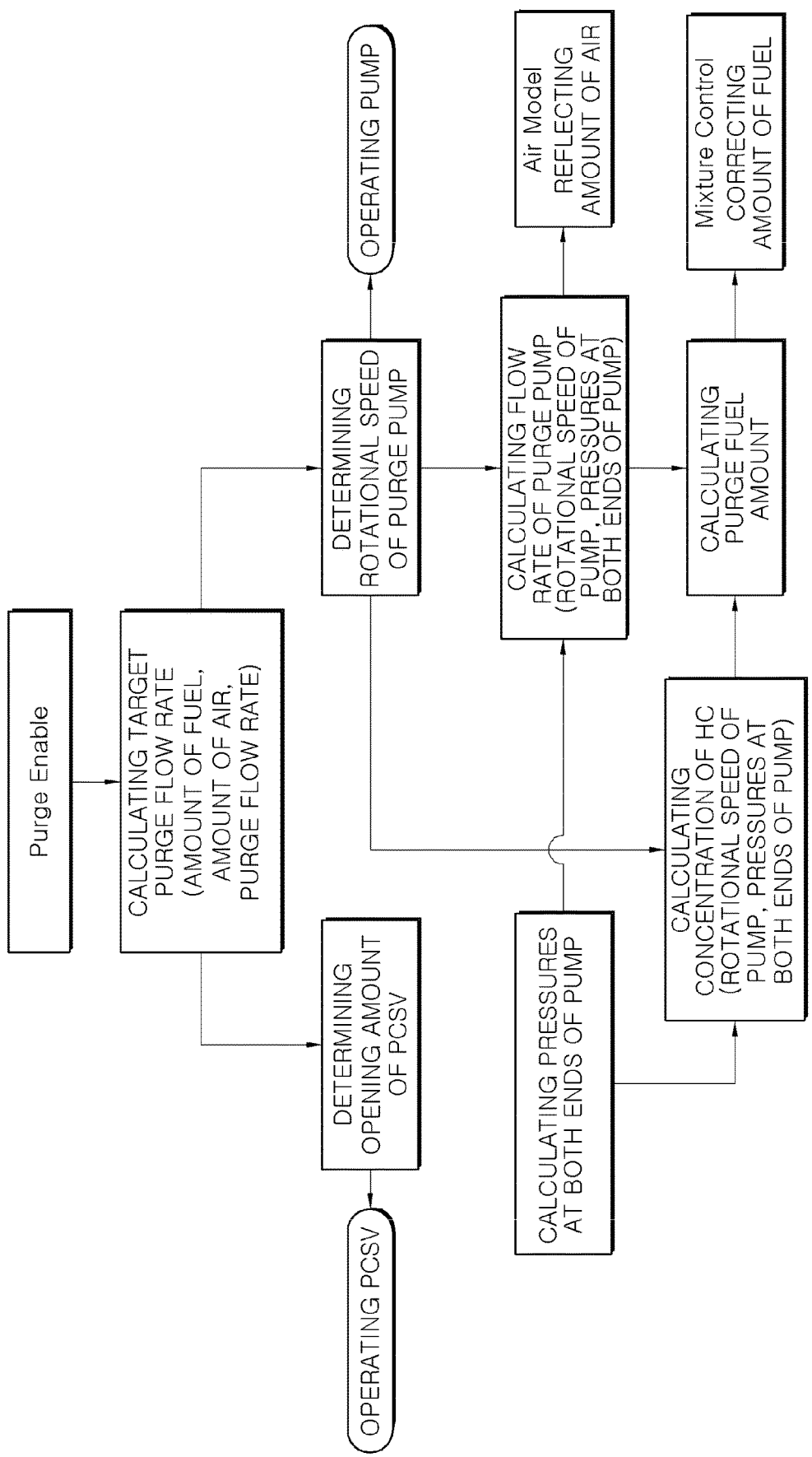
FIG. 12 is a block diagram illustrating operation of the system for improving accuracy of correction of fuel quantity at the time when an RCV is opened, as shown in FIG. 11.

As shown in FIGS. 11 and 12, a system for improving accuracy of correction of fuel quantity at the time when an RCV is opened, according to a form of the present disclosure, includes a canister 100 connected to a fuel tank T to adsorb evaporative gas, a purge line 200 connecting the canister 100 and an intake pipe I, an active purge pump 300 and a Purge Control Solenoid Valve (PCSV) 400, which are mounted to the purge line 200, a first pressure sensor 500 mounted to the purge line 200 so as to be positioned between the active purge pump 300 and the PCSV 400, a second pressure sensor 600 mounted to the purge line 200 so as to be positioned between the canister 100 and the active purge pump 300, a compressor 700 mounted to the intake pipe I, a flow path 800 of the RCV, mounted to the intake pipe I to connect between a front end of a compressor 700 close to the atmosphere and a rear end of the compressor 700 adjacent to combustion chambers, the RCV 900 mounted to a junction at the rear end of the compressor 700 out of junctions between the flow path 800 of the RCV and the intake pipe I, flow rate and flow velocity measuring sensors mounted to the intake pipe I and the purge line 200, respectively, and a control unit 1000 which receives signals from the sensors.

The system for improving accuracy of correction of fuel quantity at the time when the RCV 900 is opened, as configured above according to a form of the present disclosure, corrects injection amount of fuel to be injected to the combustion chambers when the RCV 900 is operated to be opened, based on the following consideration factors: property values of a flow path 800 of the RCV, a first calculation value obtained by calculating amount of air to be introduced into the combustion chambers after circulating from the flow path of the RCV 900 to the intake pipe I, and a second calculation value obtained by calculating amount of hydrocarbon introduced into the flow path 800 of the RCV by purging evaporative gas.

The control unit 1000 comprises a spread/delay model function constructed by modeling spread/delay of the gas introduced into the flow path 800 of the RCV and a throttle modeling function for estimating amount of air to be introduced into the combustion chambers out of circulative intake air to be circulated from the flow path 800 of the RCV to the intake pipe I when the RCV 900 is opened.

The active purge pump 300 is controlled to be operated at any one of 15,000 rpm, 30,000 rpm, 45,000 rpm and 60,000 rpm. The PCSV 400 is duty controlled such that opening amount becomes 100%, 75%, 50%, or 25%. Pressure difference between front and rear ends of the active purge pump 300 can be generated by controlling the number of revolutions and opening amounts of the active purge pump 300 and the PCSV 400. Based on the pressure difference between the front and rear ends of the active purge pump 300, concentration of the evaporative gas compressed between the active purge pump 300 and the PCSV 400 as well as flow rate of the evaporative gas flowing into the intake pipe I through the PCSV 400 can be calculated. Ultimately, based on the concentration of the evaporative gas compressed between the active purge pump 300 and the PCSV 400, density of the evaporative gas flowing into the combustion chambers can be calculated.

In the method and system for improving accuracy of correction of fuel quantity at the time when the RCV 900 is opened, as configured above according to a form of the present disclosure, the amount of fuel injected into the combustion chambers is corrected based on the amount of hydrocarbon to be introduced into the combustion chambers after having been introduced into the flow path 800 of the RCV when the RCV 900 is operated and then mixed with the evaporative gas, thereby inhibiting occurrence of misfire and engine stoppage, which may be caused because amount of fuel injected is deficient.

While the present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A method for improving accuracy of correction of fuel quantity at a time when a recirculation valve (RCV) is opened, the method comprising the steps of:
correcting injection amount of fuel based on consideration factors when the RCV is operated to be opened,
wherein the consideration factors comprise:
property values of a flow path of the RCV, the flow path being mounted to an intake pipe to connect between a front end of a compressor close to atmosphere and a rear end of the compressor adjacent to combustion chambers;
a first calculation value obtained by calculating an amount of air to be introduced into the combustion chambers after circulating from the flow path of the RCV to the intake pipe; and
a second calculation value obtained by calculating an amount of hydrocarbon to be introduced into the flow path of the RCV by purging evaporative gas,
wherein the property values of the flow path of the RCV comprise concentration of hydrocarbon contained in circulative intake air circulated to the intake pipe, and the concentration of hydrocarbon is calculated based on a spread/delay model,
wherein the spread/delay model divides the flow path of the RCV into a predetermined number of cells, wherein among the predetermined number of cells, a first cell corresponds to an inlet of the flow path of the RCV and a last cell corresponds to an outlet of the flow path of the RCV, and wherein the spread/delay model is constructed by modeling spread and delay of gas introduced into the flow path of the RCV assuming that cells of the predetermined number of cells shift in a sampling time.

2. The method according to claim 1, wherein a spread/delay model function is derived from the spread/delay model, and wherein the property values of the flow path of the RCV comprise prediction values of changes in concentration of hydrocarbon in the flow path of the RCV, which are calculated based on the spread/delay model function.

3. The method according to claim 1, wherein the first calculation value is calculated based on opening amount of the RCV and a throttle modeling function.

4. The method according to claim 1, wherein the second calculation value is calculated based on a modeling function derived from signals acquired from a plurality of measurement sensors provided in the spread/delay model.

5. The method according to claim 4, wherein concentration and flow rate of hydrocarbon are measured by the measurement sensors.

* * * * *